United States Patent [19]

Borzenski et al.

[11] Patent Number: 4,893,936

[45] Date of Patent: Jan. 16, 1990

[54] MIXING MACHINE WITH NON-INTERMESHING PAIR OF ROTORS DRIVEN SOLELY AT THE SAME ROTOR SPEED IN OPPOSITE DIRECTIONS AND HAVING A PREDETERMINED ROTATIONAL ALIGNMENT RELATIONSHIP BETWEEN THE TWO COUNTER-ROTATING ROTORS

[75] Inventors: Frank J. Borzenski, Branford; Narku O. Nortey, Trumbull, both of Conn.

[73] Assignee: Farrel Corporation, Ansonia, Conn.

[21] Appl. No.: 864,096

[22] Filed: May 16, 1986

[51] Int. Cl.[4] .............................. B01F 7/12; B29B 7/18; B29B 7/24

[52] U.S. Cl. ......................................... 366/76; 366/77; 366/300

[58] Field of Search ........................ 366/76, 77, 72, 88, 366/91, 84, 300, 97

[56] References Cited

U.S. PATENT DOCUMENTS 3,610,585 10/1971 MacLeod et al. .............. 366/300 X
4,058,297 11/1977 Seufert ................................ 366/81
4,084,263 4/1978 Millauer ........................ 366/300 X
4,284,358 8/1981 Sato et al. ..................... 366/300 X
4,300,838 11/1981 Sato et al. ............................ 366/84
4,455,091 6/1984 Bamberger et al. .................. 366/76
4,456,381 6/1984 Inoue et al. .......................... 366/97

FOREIGN PATENT DOCUMENTS 2925250 1/1980 Fed. Rep. of Germany .
882769 11/1981 U.S.S.R. .
2028153 3/1980 United Kingdom .

Primary Examiner—Philip R. Coe
Assistant Examiner—Scott J. Haugland
Attorney, Agent, or Firm—Parmelee, Bollinger & Bramblett

[57] ABSTRACT

Two horizontally opposed winged rotors move in synchronism to define a cyclically varying window between them such that improved mixing results are achieved. The wings are provided in diagonally opposed pairs such that the leading ends of all wings move in pairs through the horizontal plane of the window.

9 Claims, 6 Drawing Sheets

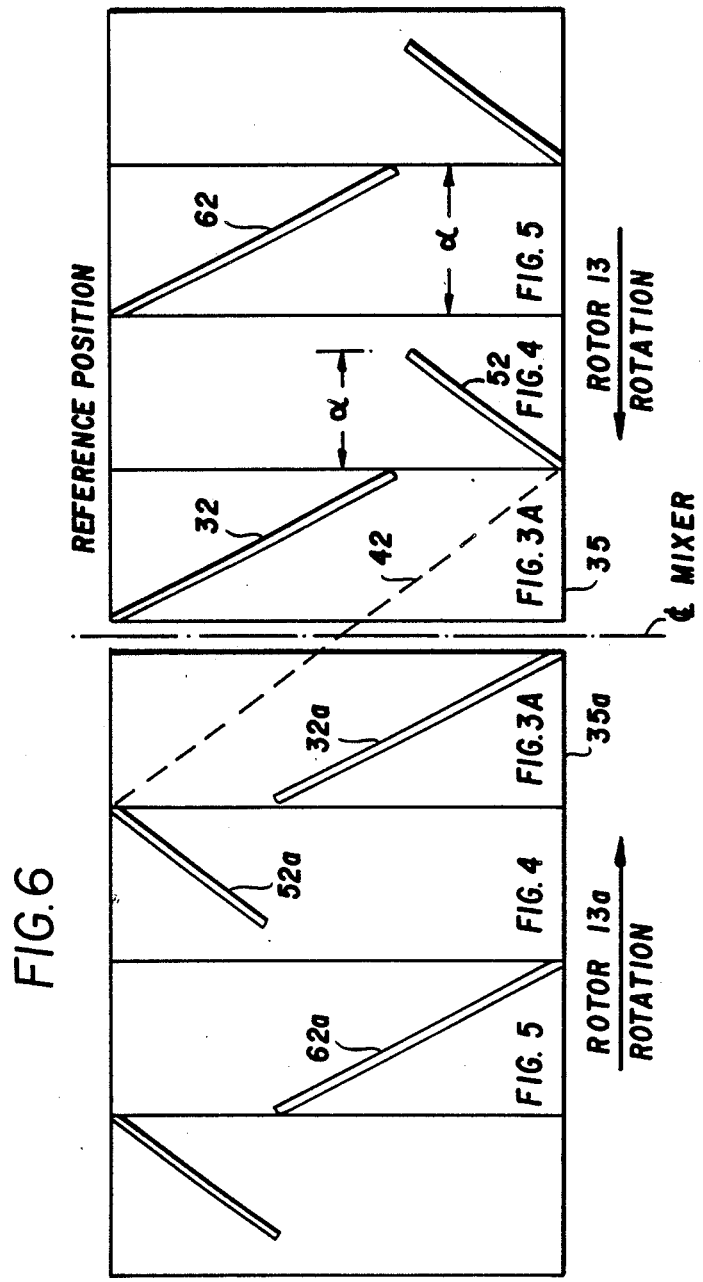

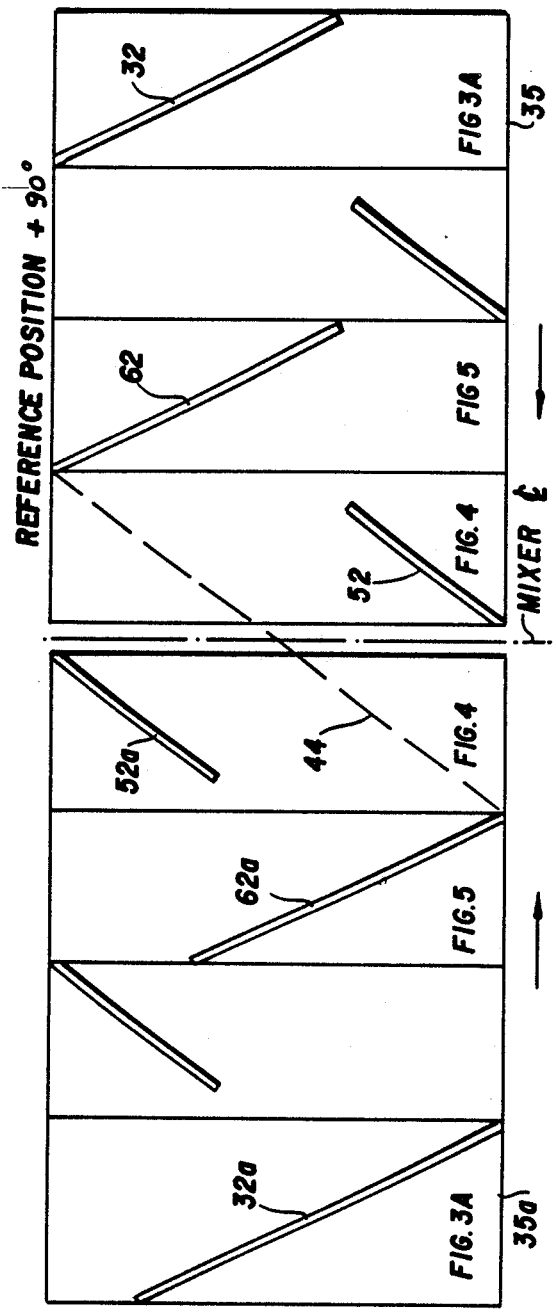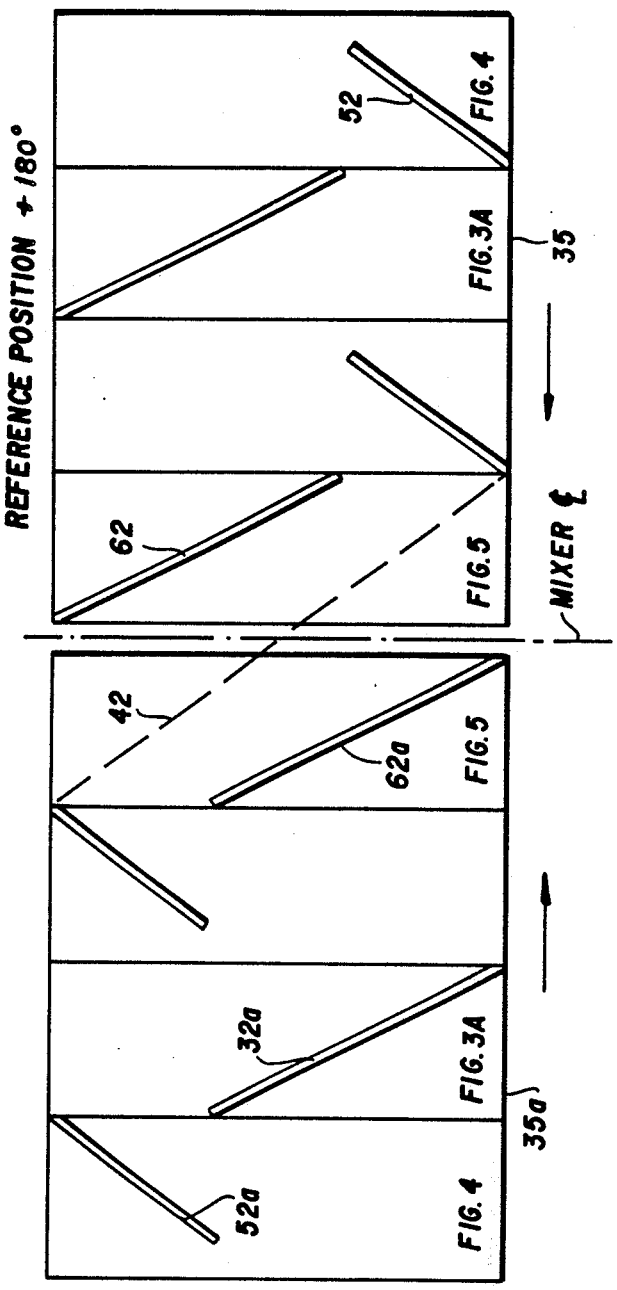

MIXING MACHINE WITH NON-INTERMESHING PAIR OF ROTORS DRIVEN SOLELY AT THE SAME ROTOR SPEED IN OPPOSITE DIRECTIONS AND HAVING A PREDETERMINED ROTATIONAL ALIGNMENT RELATIONSHIP BETWEEN THE TWO COUNTER-ROTATING ROTORS

This invention relates generally to mixing machines of the batch type, that is, machines having a mixing chamber so shaped to accommodate two counter-rotating winged rotors that mix batches of ingredients fed successively to the mixing chamber from a charging chamber by a reciprocating ram. Once mixed the ingredients are removed through a discharge opening and a door closes the opening for mixing a further batch in the chamber.

The present invention seeks to optimize the behavior of the ingredients being mixed by providing a cyclically repeatable window of interaction between the winged rotors as they turn in opposite directions through at least one revolution of the rotors.

Conventional high intensity batch mixers have two counter-rotating winged rotors, driven at the same or slightly different speeds through connecting gears, and the winged rotors act on the ingredients to move the material from one portion of the mixing chamber to another. The rotor wings also act on the ingredients to achieve movement of the material along the axis of each of the rotors. Prior art U.S. Pat. No. 3,610,585 held by the assignee herein illustrates a typical prior art rotor configuration, and it will be noted that these rotors have blades or wings which do not intermesh with one another so that these rotors can be driven at either slightly different speeds or at the same speed.

The general object of the present invention is to optimize the mixing behavior of the mixer by providing a cyclically repeatable flow pattern in the window of interaction between the rotors in the mixing chamber where the opposed rotors and wings interact with one another.

In its presently preferred form the mixing machine of the present invention includes a housing defining a mixing chamber, and more particularly defining horizontally opposed parti-cylindrical cavities with open sides facing one another. The mixing chamber is further defined by the lower end of the ram that feeds the materials into the chamber through an inlet opening, and by a hinged door that closes a lower outlet opening. The ram and door cooperate with these chamber cavities to define the mixing chamber. Counter-rotating rotors are provided in each of the parti-cylindrical cavities and each rotor has at least two generally spiral shaped wings, each wing having a leading end and a trailing end. The rotors turn on parallel axes and these axes cooperate with the end walls of the mixing chamber to define a rectangle in a horizontal reference plane extending across the cavities and mixing chamber. A window of variable geometry is provided between these rotors in the reference plane as a result of the rotor wings moving through said plane. Each rotor wing is arranged so that its leading end is located adjacent one of the end walls of the mixing chamber and so that its trailing end is provided intermediate the end walls and in spaced circumaxial relationship behind the leading end by an angle alpha. Furthermore, the wings are more particularly provided on opposed rotors in opposed pairs, one pair provided on opposite sides of one diagonal of the rectangle and a second pair of rotor wings provided on opposite sides of the second diagonal of the rectangle. Thus, the leading ends of these paired wings will preferably move simultaneously through the reference plane in pairs, and at predetermined times during the cycle of revolution for the rotors themselves so that the successively formed window shapes and sizes are repeatable during every revolution of the rotors. In its presently preferred form the mixing machine is provided with four pairs of rotor wings each of which pairs acts to so form the variable geometry window during each 90 degrees of rotation of the winged rotors.

At least one winged pair comprises long wings that overlap one another axially in cooperating to so define the window, and in the presently preferred embodiment two such pairs of long wings are provided to act on the mix in a cyclical fashion that repeats not only every 360 degrees of each revolution of the rotors but also repeats itself during each 180 degrees of travel for these rotors.

Figure 3:
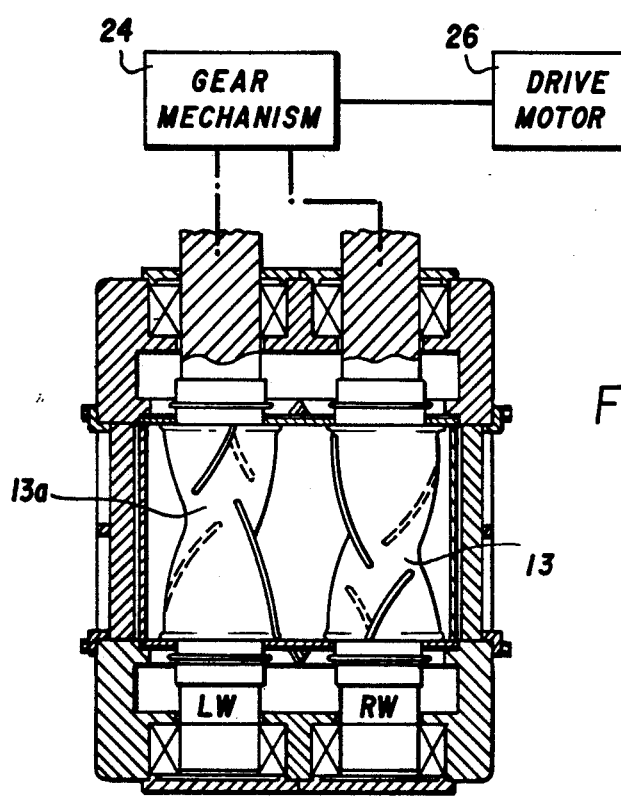
FIG. 3 is a horizontal section taken generally on the line 3—3 of FIG. 1.
Figure 3A:
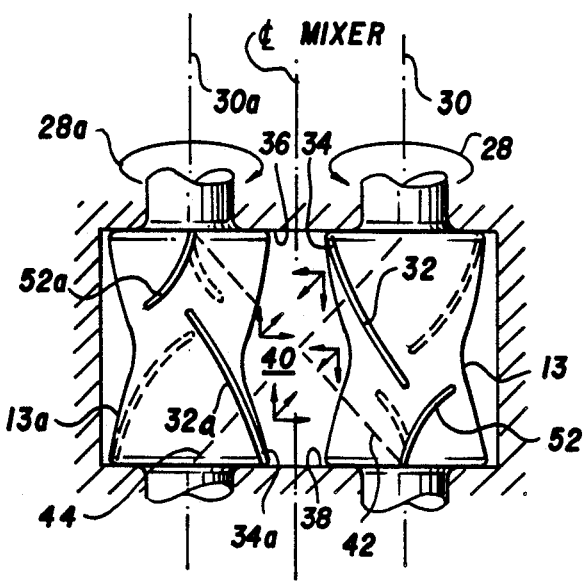
FIG. 3A is a schematic view of the relationship between the two counter-rotating rotors in the preferred alignment pursuant to the present invention.
Figure 4:
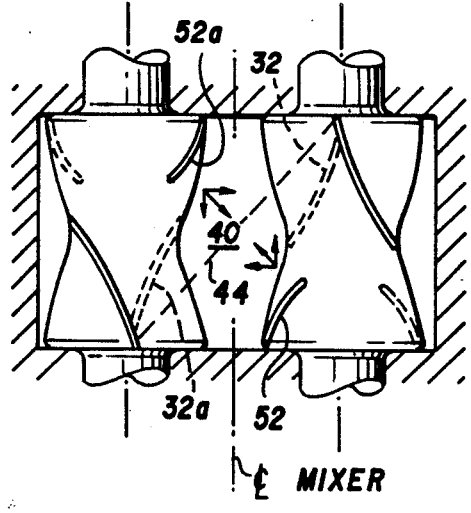
FIG. 4 is a view similar to FIG. 3A but taken at a slighlty later instant of time wherein both rotors have turned through 90 degrees relative to the position illustrated in FIG. 3A.
Figure 5:
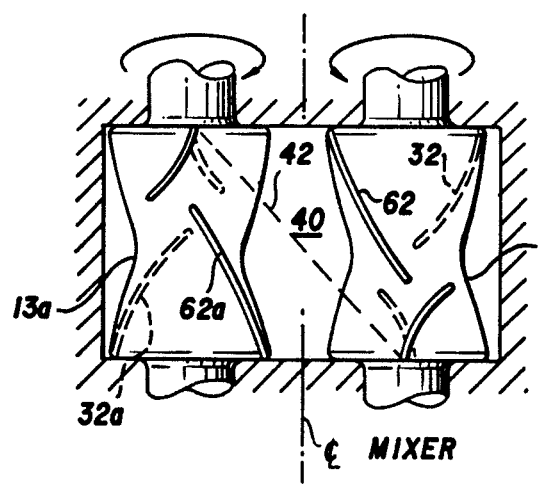

FIG. 5 is a view similar to FIGS. 3A and 4, but illustrating the rotors after a further 90 degrees of rotation, that is after having rotated 180 degrees from the FIG. 3A positions.

FIG. 6 illustrates in schematic fashion, the orientation of the rotor wings in the views of FIGS. 3A by unwrapping the cylindrical envelope which contains the rotor wings.

FIG. 7 is a view similar to FIG. 6 but illustrating the rotor wing orientations after 90 degrees of rotation for the rotors and corresponds to FIG. 4.

FIG. 8 is a view similar to FIGS. 6 and 7 but illustrating the rotor wings 90 degrees beyond the position of FIG. 7 and 180 degrees beyond the position of FIG. 6, and corresponds to FIG. 5.

Figure 9:
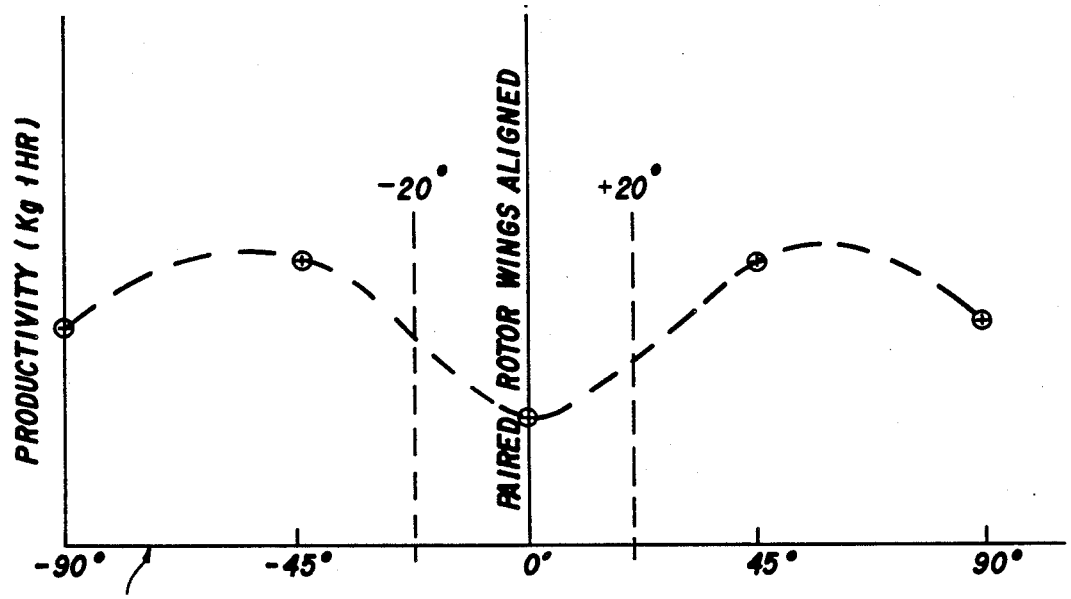

FIG. 9 is a graphical presentation of the effect on rotor productivity (Kg/hr) of departing slightly from 0° alignment of the rotors, that is with one rotor provided in a different angular relationship from the zero degree relationship suggested in FIGS. 3A, 4 and 5.

Figure 10:
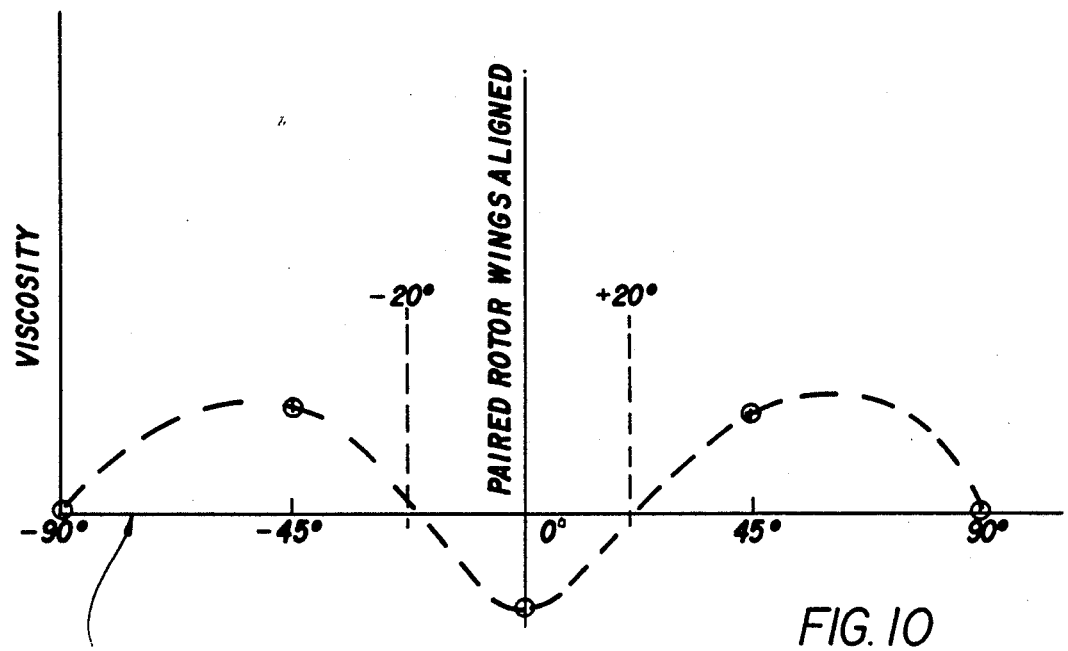

FIG. 10 is a graphical presentation of the effect on mix viscosity of slight non alignment between the rotors as suggested in FIG. 9, both FIG. 9 and FIG. 10 having the same horizontal units of rotor rotational alignment (that is, 0° alignment ± nonalignment).

Figure 1:
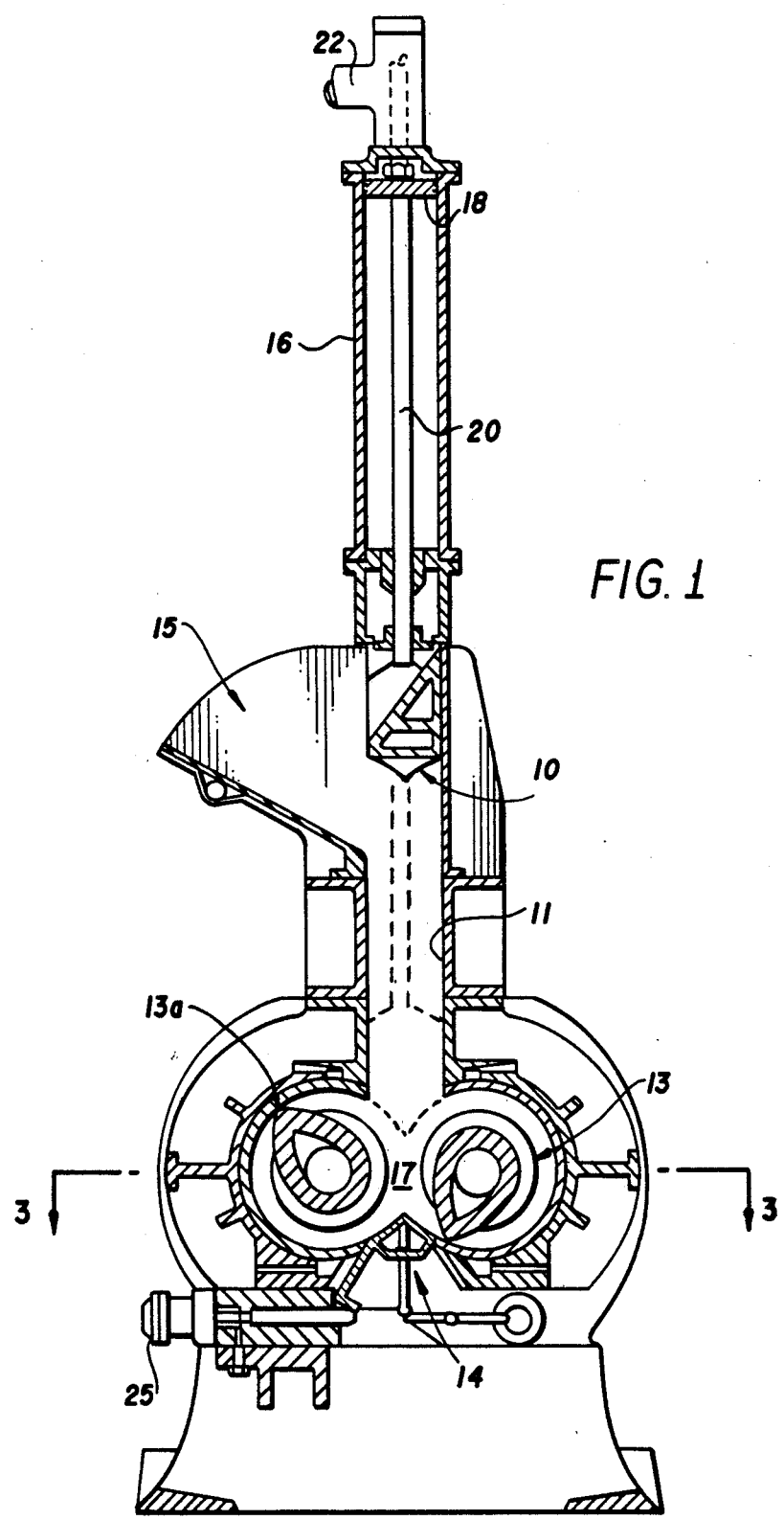
FIG. 1 is a schematic view illustrating the overall mixing machine in vertical section.
Figure 2:
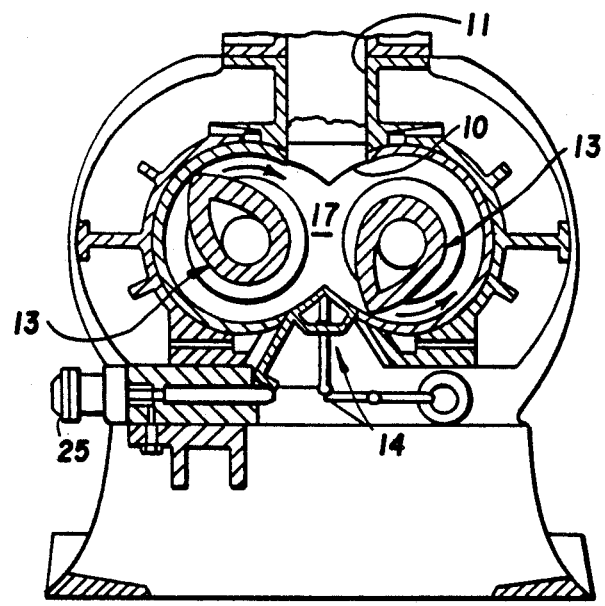
FIG. 2 is a vertical section through the lower portion of the machine illustrated in FIG. 1, and shows the ram in its down position.

Turning now to the drawings in greater detail, FIGS. 1 and 2 show a mixing machine including a vertically reciprocable ram 10 movable between the position shown in FIG. 1 and the position shown in FIG. 2 to move a batch of ingredients to be mixed from a charging chamber 11 into a mixing chamber 17. Two counter-rotating rotors 13 and 13a have wings that act on these ingredients to achieve a thorough mixing thereof. The reader is referred to prior U.S. Pat. No. 3,610,585 and to U.S. Pat. No. 2,962,186 for a more complete description of the general aspects of such a mixing machine.

The ingredients are initially introduced to hopper 15 while the ram 10 is in its raised position (FIG. 1) so that the ingredients drop downwardly into the chamber 11 where they are compressed and fed into the mixing chamber 17 by the ram 10. Once a batch has been mixed a hinged door 14 opposite the ram 10 is opened to withdraw the mixed materials. A locking device 25 is provided for securing the door 14 in place during mixing process. The ram 10 is preferably operated by a vertically reciprocable fluid motor in the form of actuator 16 having a piston 18 provided in a cylinder for movement of actuating rod 20. The ram 10 is attached to the lower end of actuating rod 20 externally of cylinder 16 and air pressure is selectively provided to line 22 for urging the piston downwardly from the FIG. 1 position to the FIG. 2 position. The ram 10 is retracted by air pressure to the opposite side of piston 18.

As best shown in FIG. 3 rotors 13 and 13a are driven in opposite directions by a conventional gear mechanism 24 through drive motor 26. The gear mechanism 24 may comprise identical gears where the rotors are to be driven at the same speed, or in the alternative, a typical mixer generally has so-called friction ratio gears that permit the rotors to be driven at different speeds. However, and in accordance with the present invention the gear mechanism 24 serves solely to drive the rotors 13 and 13a at the same speed and at opposite directions so as to realize the advantages of the present invention. Drive motor 26 may be of conventional configuration, and preferably includes suitable means for varying the speed of rotation for the rotors, said speeds being dictated in large part by the ingredients being mixed.

In accordance with the present invention non-intermeshing rotors 13 and 13a are driven in opposite directions as indicated by the arrows 28 and 28a respectively in FIG. 3A such that diagonally opposed long wings 32 and 32a are arranged in opposed pairs to act on the mix in the window defined by the horizontal plane of the rotor axes 30 and 30a.

Although generally spiral shaped rotor wings of long and of short axial configuration are known from the prior art, and clearly shown in U.S. Pat. No. 3,610,585 for example, the present invention deals specifically with the phase relationship between the opposed rotors and the orientation of these spiral shaped wings such that in both rotors of FIG. 3A the leading end 34 and 34a of each wing 32 and 32a respectively moves adjacent to one of the axially opposed end walls 36 and 38 of the mixing chamber.

As a result first of orienting the wings so that each has its leading end moving simultaneously through the reference plane defined by the rotor axes, and also as a result of orienting the wings so that their respective leading ends are located adjacent the end walls of the mixing chamber, the improved mixing is achieved in that the wings not only achieve a transverse or extensive mixing whereby the ingredients are urged from one parti-cylindrical cavity portion of the mixing chamber to the other, but intensified mixing is achieved as a result of squeezing of the mix axially toward the center 40 of the mixing chamber 17 (where the center 40 is defined by the intersection between two diagonals 42 and 44 of a rectangle defined by the end walls 36 and 38 and by the rotor axes 30 and 30a). One such diagonal 42 has the paired rotor wings 32 and 32a provided on opposite sides thereof in FIG. 3A, that is in a position for the rotors referred to hereinafter as a reference or zero degree position. The combination of transverse and axial squeeze mixing is illustrated in FIG. 3A by the four force diagrams illustrating the tendency for the rotor wings 32 and 32a to achieve movement of the mix generally toward the one diagonal 42 defined above. Also, material at the center of the mixer is moved by the wings into the parti-cylindrical cavities to be mixed by a shearing action.

In further accordance with the present invention a second pair of rotor wings 52 and 52a in each of the rotors 13 and 13a, respectively, are provided with their leading ends located in an axial plane defined by the trailing ends of the one pair of rotors 32 and 32a referred to previously. More particularly, this second pair of rotor wings 52 and 52a are provided at least 90 degrees behind the one longer pair referred to in the preceding paragraphs. These shorter rotor wings 52 and 52a act on the mix in substantially the same manner as the longer wings 32 and 32a described above. Each of these shorter wings 52 and 52a has its leading end adapted to simultaneously intersect the reference plane defined by the axes 30 and 30a at a point in time when the longer rotor wings 32 and 32a have passed through the reference plane and this next portion of the rotor cycle is illustrated in FIG. 4. Note that these shorter rotor wings 52 and 52a are oriented on opposite sides of the second diagonal 44 referred to previously with reference to FIG. 3A. Similar diagrams are also provided in FIG. 4 to illustrate the fact that the mix is acted on by the wings so as to impart both transverse and axial flow directions whereby transverse and intensive mixing are achieved.

FIGS. 3A, 4 and 5 represent positions for the horizontally opposed rotors and more particularly of the rotor wings at 90 degree intervals during a portion of the 360 degrees of rotation for these rotors. The cycle of rotor rotation is repeated for each revolution of the rotors. In the preferred form of rotor illustrated in these views, that is where two pairs of long and two pairs of short rotor wings are provided thereon, it will be apparent that this cycle of window geometry defined by the wings and the body portions of the rotors in the area of the horizontal reference plane will repeat itself twice during each such rotor revolution cycle. For example, FIG. 5 illustrates the configuration for the rotors 13 and 13a after 180 degrees of rotor rotation and, although FIG. 5 is identical to FIG. 3A, it is noted that the longer rotor wings 62 and 62a occupy the same positions as did the long other pair of rotor wings 32 and 32a in FIG. 3A.

The repetitive window geometry between the opposed rotors achieved by the rotor wing configuration of the present invention is illustrated graphically in FIGS. 6, 7 and 8. The various frames illustrated in these views correspond to the rotor positions illustrated 3A, 4 and 5 and such frames are appropriately annotated in FIGS. 6, 7 and 8 for clarity. In FIG. 6 the two adjacent frames illustrated at 35 and 35a on opposite sides of the mixer center line 39 shows schematically the long rotor wings 32 and 32a arranged at opposite sides of the diagonal 42. The adjacent frames are to illustrate the configuration for the other wings 52 and 52a discussed previously with reference to FIG. 4 and 62 and 62a discussed above with reference to FIG. 5.

FIG. 7 simply shows the frames 35 and 35a having moved away from the center window defined by the opposed rotors and instead said window having been defined by the rotor wings 52 and 52a arranged at opposite sides of the second diagonal 44 as referred to previously.

FIG. 8 illustrates another successive 90 degrees of rotation from that of FIG. 7 wherein the center frames define the variable geometry window as a result of downward movement for the rotor wings 62 and 62a. Thus, FIG. 6 corresponds to FIG. 3A, FIG. 7 to FIG. 4, and FIG. 8 to FIG. 5 in terms of the orientation for the rotors 13 and 13a and more particularly of these wings in these various views.

FIGS. 9 and 10 must be interpreted together, and these graphical presentations illustrate qualitatively the results achieved by aligning the rotors as described above and rotating them at the same speed to provide the cyclically repeatable window geometry in the mixing chamber.

The horizontal base line in each view (FIGS. 9 and 10) shows the level of productivity and the viscosity level achieved with the rotors turning at different speeds relative to one another (more particularly, with a friction ratio of 1.12 to 1).

In FIG. 9 it will be seen that the productivity (Kg/hr) is slightly better with the rotors aligned (zero degree), per the preferred arrangement described above, than with the random alignment that results from rotating one rotor at a speed different from that of the other rotor. In fact, one can achieve even greater "productivity" gains if the rotors are rotated at the same speed and are aligned at a differential angular relationship than the zero degree alignment. However, "productivity" is not the sole criteria, and one must also consider viscosity since the purpose here is not simply to move material, as in a pump, but to mix material and provide material of minimum viscosity.

FIG. 10 shows that the reduction in viscosity (at zero degree rotor alignment) is best. The combined results of tests for both viscosity and productivity show that the advantages of the present invention can be realized if only the rotors are close to the zero degree alignment referred to above. More specifically, the rotors should be within their ±20 degrees of this zero degree orientation for best results.

In conclusion then, the rotor configuration and operation as described above has led to improved viscosity and productivity for non-intermeshing synchronized rotors over the results one can expect from the nonsynchronized rotors. The mix is rendered less viscous in a shorter period of time utilizing the above described rotor configurations as compared to the result achieved with the rotor configuration of prior art U.S. Pat. No. 3,610,585 for example.

We claim:

1. A mixing machine of the batch type for mixing batches of ingredients comprising housing means defining two horizontally opposed parti-cylindrical cavities with open sides facing one another and defining a chamber, said housing means having vertically spaced inlet and outlet openings communicating with said chamber and with said cavities, axially opposed end walls for said cavities and chamber, a ram for closing said inlet opening, a door for closing said outlet opening, two opposed non-intermeshing mixing rotors, respective ones of said rotors being provided in respective ones of said cavities, each said rotor having at least two generally spiral shaped wings, each wing having a leading end and a trailing end, drive means for rotating said rotors on parallel axes in said parti-cylindrical cavities, said drive means solely driving said rotors at the same speed and at opposite directions, said axes and end walls defining a rectangle in a horizontal reference plane extending across said cavities and chamber, said mixing rotors being non-intermeshing and turning in opposite directions at identical rotary speed to provide a window between the rotors and within said rectangle, said window having a cyclically variable geometry repeatable during each and every revolution of the rotors as a result of the rotor wings moving through said rectangle in the horizontal reference plane, each said rotor wing leading end being located adjacent one of said end walls and each rotor wing trailing end being located intermediate said end walls and being spaced circumaxially behind its leading end by an angle alpha relative to the direction of rotor rotation, said wings of opposed rotors being arranged in opposed pairs, a first pair of opposed rotor wings being on opposite sides of a first diagonal of said rectangle as said first pair of opposed rotor wings are moving through said rectangle at identical rotor speed, said first pair of opposed wings having leading ends that simultaneously move through said rectangle in the horizontal reference plane at approximately a same first time when said rotors turning at identical rotor speed have a predetermined constant rotational alignment relationship between them, said predetermined constant rotational alignment relationship being within ±20 degrees of zero degree alignment of the leading ends of said first rotor wings for transverse and axial squeeze mixing of the ingredients between said first pair of opposed rotor wings moving through said rectangle in the horizontal reference plane, said transverse and axial squeeze mixing between said first pair of rotor wings being toward said first diagonal from opposite sides of said first diagonal, and a second pair of opposed rotor wings being on opposite sides of a second diagonal of said rectangle as said second pair of opposed rotor wings are moving through said rectangle at identical rotor speed, said leading ends of said second pair of opposed rotor wings simultaneously moving through said rectangle in the horizontal reference plane at approximately a same second time, said second time being at a point in time after said first pair of opposed rotor wings have passed through said rectangle for transverse and axial squeeze mixing of the ingredients between said second pair of rotor wings moving through said rectangle in the horizontal reference plane, said transverse and axial squeeze mixing between said second pair of rotor wings being toward said second diagonal from opposite sides of said diagonal, said pairs of opposed wings cooperating to define successively formed window shapes and sizes that are repeated during each and every revolution of the opposed rotors, whereby ingredients in the chamber are mixed and urged from one parti-cylindrical cavity to the other parti-cylindrical cavity, and the mix is squeezed axially towards an intersection of said first and second diagonals of said rectangle at least twice during each and every revolution of the counter-rotating rotors turning at identical rotary speed.

2. The mixing machine of claim 1 wherein said first pair of opposed rotor wings have sufficient length in the axial direction that said wings of said first pair overlap one another axially.

3. The mixing machine of claim 2 wherein said second pair of opposed rotor wings have an axial length shorter than said first pair of opposed rotor wings.

4. The mixing machine of claim 3 wherein said angular relationship alpha between the leading and trailing ends of each of said wings of said first pair is at least 90 degrees.

5. The mixing machine of claim 4, further characterized by a third pair of opposed rotor wings being on opposite sides of said first diagonal as said third pair of opposed rotor wings are moving through said rectangle at identical rotor speed, said third pair of opposed rotor wings having leading ends that simultaneously move through said rectangle in the horizontal reference plane at approximately a same third time when each of said rotors has turned 180 degrees from its respective position at said first time for transverse and axial squeeze mixing of the ingredients between said third pair of opposed rotor wings moving through said rectangle in the horizontal reference plane, said transverse and axial squeeze mixing between said third pair of opposed rotors being toward said first diagonal from opposite sides of said first diagonal.

6. The mixing machine of claim 5, further characterized by a fourth pair of opposed rotor wings being on opposite sides of said second diagonal as said fourth pair of opposed rotor wings are moving through said rectangle at identical rotor speed, said fourth pair of opposed rotor wings having leading ends that simultaneously move through said rectangle in the horizontal reference plane at approximately a same fourth time for axial and transverse squeeze mixing of the ingredients between said fourth pair of opposed rotor wings moving through said rectangle in the horizontal reference plane, said transverse and axial squeeze mixing between said fourth pair of opposed rotors being toward said second diagonal from opposite sides of said second diagonal, said second pair of opposed rotor wings being arranged opposite said fourth pair of opposed rotor wings in their respective rotors and relative to their respective axes.

7. The mixing machine of claim 6 wherein said second and fourth pairs of opposed rotors wings have their respective leading ends oriented in diametrically opposed relationship to one another, and wherein said first and third pairs of opposed rotor wings have their respective leading ends oriented in diametrically opposed relationship to one another, said diametrical opposed orientations of said paired leading ends being arranged at right angles to one another.

8. The method of mixing a batch of ingredients in a mixing machine of the batch type having a housing defining two horizontally opposed parti-cylindrical cavities with open sides facing one another and defining a chamber, said housing having vertically spaced inlet and outlet openings communicating with said chamber and with said cavities, axially opposed end walls for said cavities and chamber, a ram for closing said inlet opening, a door for closing said outlet opening, two opposed, non-intermeshing mixing rotors, respective ones of said rotors being provided in respective ones of said cavities, each said rotor having at least two generally helical shaped wings, each wing having a leading end and a trailing end, said method of mixing comprising the steps of:

solely driving said rotors at identical speed in opposite directions on parallel horizonal axes,
orienting said rotors at a predetermined rotational alignment relationship between them,
said predetermind rotational alignment being within ±20 degrees of zero degree alignment of the leading ends of the first rotor wings, locating a first of said rotor wings on each rotor for serving as a first pair of opposed rotor wings for moving said first pair of opposed rotor wings at identical rotor speed through a horizontal reference rectangle defined by said rotor axes and said two end walls, said first pair of opposed rotor wings moving through said rectangle on opposite sides of a first diagonal of said rectangle with said leading ends of said first pair of opposed rotor wings being adjacent respectively to the end walls and moving through said rectangle at approximately the same first time for transversely and axially squeeze mixing the ingredients between said first pair of opposed rotor wings moving through said rectangle on opposite sides of said first diagonal, said transversely and axially squeeze mixing between said first pair of opposed rotor wings being toward said first diagonal from opposite sides of said first diagonal, locating a second of said rotor wings on each rotor for serving as a second pair of opposed rotor wings for moving said first pair of opposed rotor wings at identical rotor speed through the rectangle, said second pair of opposed rotor wings moving through said rectangle on opposite sides of a second diagonal of said rectangle with said leading ends of said second pair of opposed rotor wings being adjacent respectively to the end walls and moving through said rectangle at approximately the same second time, said second time being at a point in time after said first pair of opposed rotor wings have passed through said rectangle for transversely and axially squeeze mixing the ingredients between said second pair of opposed rotor wings moving through said rectangle, and said tranversely and axially squeeze mixing between said second pair of opposed rotor wings being toward said second diagonal from opposite sides of said second diagonal, thereby said transversely and axially squeeze mixing from opposite sides of said first diagonal and from opposite sides of said second diagonal are each repeated during each and every revolution of the two rotors.

9. The method of mixing as claimed in claim 8, comprising the further steps of:

locating a third and a fourth helical shaped wing on each rotor each wing having a leading and a trailing end, with said third wing on each rotor being opposite the first wing on the rotor and with the fourth wing on each rotor being opposite the second wing on the rotor, said third wings on the rotors for serving as a third pair of opposed rotor wings moving through the rectangle at identical rotor speed on opposite sides of said first diagonal with their leading ends being adjacent respectively to the end walls and moving through said rectangle at approximately a same third time when each of said rotors has turned 180 degrees from its respective position at said transverse time for transversely and axially squeeze mixing he ingredients between said third pair of opposed sides of said first diagonal, said transversely and axially squeeze mixing between said third pair of opposed rotor wings being toward said first diagonal from opposite sides of said first diagonal, said fourth wings on the rotors for serving as a third pair of opposed rotor wings moving through the rectangle at identical rotor speed on opposite sides of said second diagonal with their leading ends being adjacent respectively to the end walls and moving through said rectangle at approximately a same fourth time for axially and transversely squeeze mixing the ingredients between said fourth pair of opposed rotor wings moving through said rectangle on opposite sides of said fourth diagonal, said transversely and axially squeeze mixing between said fourth pair of opposed rotor wings being toward said second diagonal from opposite sides of said fourth diagonal, thereby said transversely and axially squeeze mixing from opposite sides of said first diagonal and from opposite sides of said second diagonal are each repeated twice during each and every revolution of the two rotors.

* * * * *